United States Patent [19]

Slater et al.

[11] 4,366,343
[45] Dec. 28, 1982

[54] CABLE CLAMP MEANS AND CABLE ENTRY PORT CLOSURE MEANS FOR ELECTRICAL OUTLET BOXES AND THE LIKE

[75] Inventors: Thomas S. Slater, Port Washington; Wade R. Bowden, Jr., Northport, both of N.Y.

[73] Assignee: Slater Electric Inc., Glen Cove, N.Y.

[21] Appl. No.: 879,767

[22] Filed: Feb. 21, 1978

[51] Int. Cl.³ .............................................. H02G 3/08
[52] U.S. Cl. ............................. 174/65 R; 220/3.2; 220/268; 339/103 R
[58] Field of Search .................. 174/65 R, 53, 153 G, 174/65 G; 220/3.2-3.94, 265, 266, 268; 339/103 R, 103 B, 103 C, 107; 248/56

[56] References Cited

U.S. PATENT DOCUMENTS

| | | | |
|---|---|---|---|
| 1,039,955 | 10/1912 | Keefe | 220/266 X |
| 1,242,533 | 10/1917 | Duck | 220/3.3 X |
| 1,971,831 | 8/1934 | Fullman | |
| 1,980,831 | 11/1934 | Rosenfield | |
| 2,466,504 | 4/1949 | Stoyer | |
| 2,688,417 | 9/1954 | Bowers | |
| 2,814,510 | 11/1957 | Clark | |
| 2,850,300 | 9/1958 | Jennings | |
| 3,084,958 | 4/1963 | Appleton | 174/65 R X |
| 3,112,938 | 12/1963 | Karlin | |
| 3,288,407 | 11/1966 | Downer et al. | 174/153 G X |
| 3,351,974 | 11/1967 | Wilhelmi | 174/153 G X |
| 3,493,205 | 2/1970 | Bromberg | |
| 3,788,582 | 1/1974 | Swanquist | |
| 3,873,759 | 3/1975 | Schindler et al. | 174/65 R |
| 4,007,852 | 2/1977 | Gernhardt | 220/266 X |
| 4,030,800 | 6/1977 | Vidoni et al. | 339/107 |
| 4,076,364 | 2/1978 | Kuo | 339/103 R |
| 4,082,915 | 4/1978 | Silver | 174/65 R X |
| 4,202,457 | 5/1980 | Tansi | 220/3.3 |

FOREIGN PATENT DOCUMENTS

| | | | |
|---|---|---|---|
| 349319 | 10/1960 | Switzerland | 174/65 R |
| 459323 | 9/1965 | Switzerland | |
| 988663 | 4/1965 | United Kingdom | 174/153 G |
| 1396790 | 6/1975 | United Kingdom | 339/101 |

OTHER PUBLICATIONS

Brochure showing #425 "Bush-Grip Connectors" made by Blackhawk Industries, Dubuque, Iowa.
German printed application 2,349,766, Bom, Oct. 1972.

*Primary Examiner*—A. T. Grimley
*Assistant Examiner*—David A. Tone
*Attorney, Agent, or Firm*—Morgan, Finnegan, Pine, Foley & Lee

[57] ABSTRACT

The structure according to the invention includes a pair of flange members depending angularly towards each other from opposite sides of each electrical power cable entry port formed in a sidewall portion of an electrical outlet box, with each pair of cooperating flange members adapted to enable essentially complete closure of the cable entry port. According to one aspect, each cooperating pair of flange members comprises a pair of cable grasping detent flanges, each spaced from its corresponding wall portion by a base-like projection to accommodate an entry port closure panel. According to another aspect, the inward edges of each cooperating pair of flange members are coupled together to close the cable entry port which may be formed with a portion extending into the backwall, with a rigid flange depending from the sidewall portion and extending parallel to the front edges of the flange members. Each pair of flange members may be a pair of cable grasping detent flanges coupled together by a frangible web-like member extending between their grasping edges, or the flange members may be relatively thin panel members forming a shallow angle with their corresponding sidewall portions, with their adjacent edges joined directly to each other.

18 Claims, 13 Drawing Figures

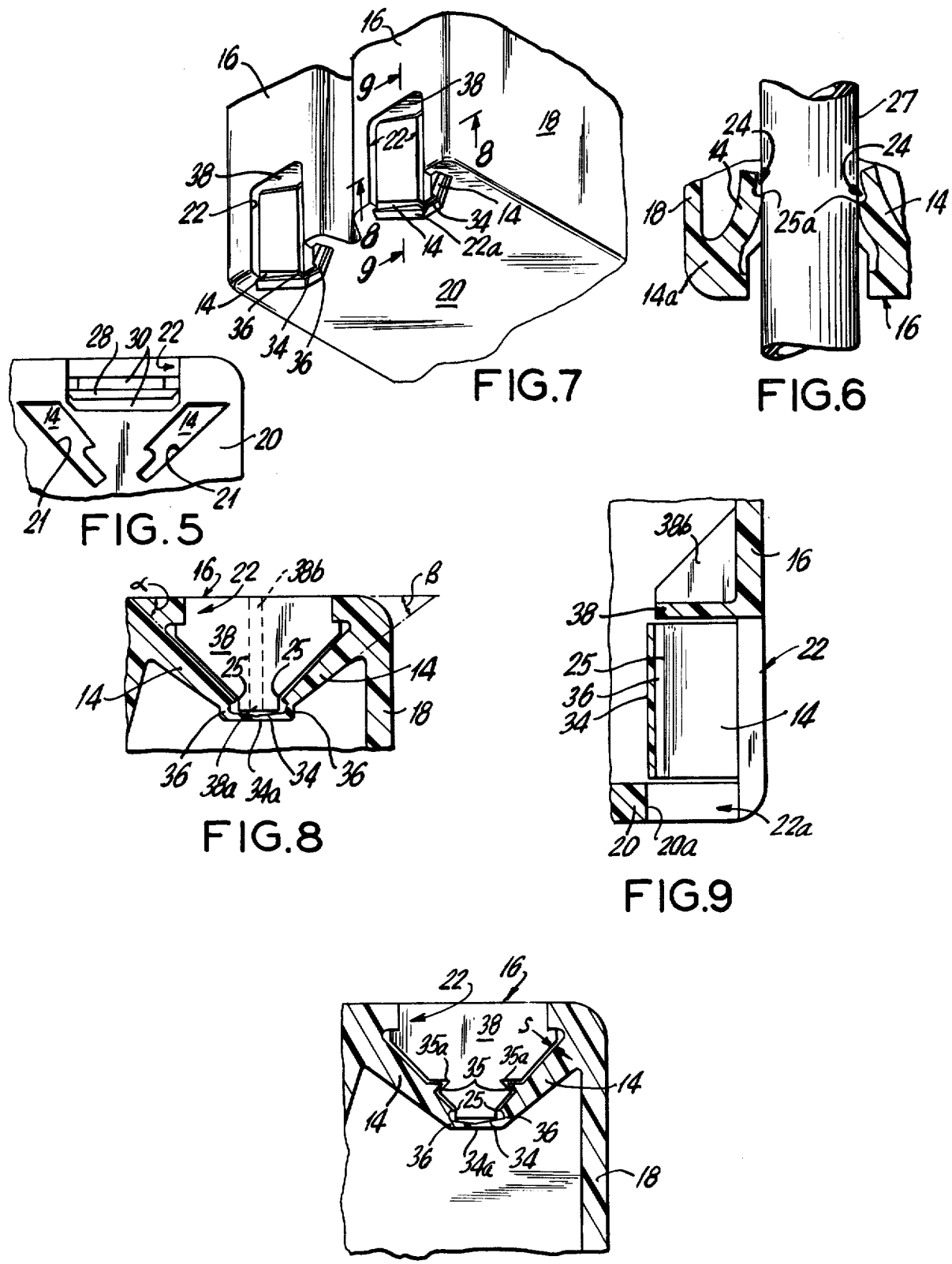

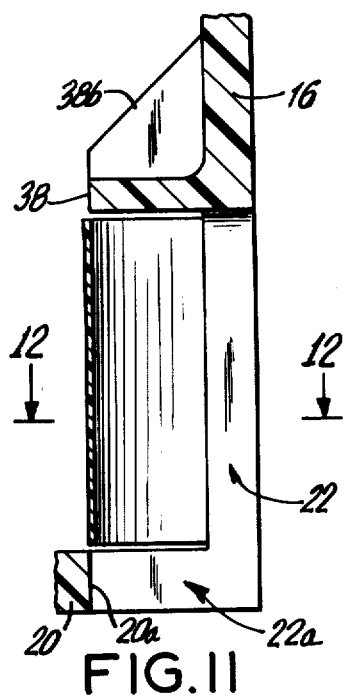
FIG.11
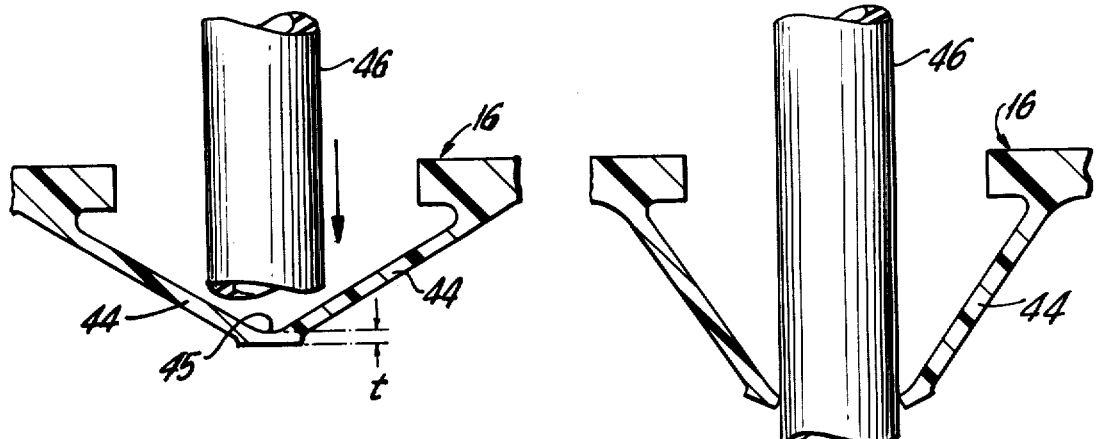
FIG.12
FIG.13

CABLE CLAMP MEANS AND CABLE ENTRY PORT CLOSURE MEANS FOR ELECTRICAL OUTLET BOXES AND THE LIKE

BACKGROUND AND OBJECTS OF THE INVENTION

The present invention relates generally to electrical outlet boxes and the like, and, more particularly, to cable clamp means formed integrally with an electrical outlet box, for securing an insulated electrical cable therein, as well as to closure means for cable entry ports.

It will be understood that although the present invention is described with particular reference to electrical outlet boxes which are adapted to house the termination (i.e., electrical connection) between an electrical power cable and an electrical fixture such as an electrical outlet receptacle or an electrical switch, the present invention can be adapted, where desired, for use in other housings for electrical distribution appliances, such as electrical junction boxes, flush type boxes, etc. Accordingly, when used herein, the term "electrical outlet box" is intended to embrace such additional structures.

The usual electrical outlet box is constructed in a generally box-like configuration with a generally continuous sidewall member depending from a back (or bottom) wall, and formed with one or more openings (usually referred to as "knockout windows") in the sidewall member, which are adapted to permit access to the interior of the box by electrical cables. Accordingly, one or more electrical power cables are inserted into the box, each through a knockout window, for connection to (or termination with) the electrical fixture to be mounted in the box. Moreover, in order to prevent debris from entering the box through knockout windows that are not utilized, and to minimize fire spread if the electrical appliance housed in the box malfunctions, the windows are closed by knockout panels which are removably attached to the box, across each window.

However, in some applications, it has been found that the connection between the electrical conductors and the electrical appliance may be stressed or dangerously loosened by forces exerted on the cable at other locations during installation. In addition, during construction of the structure in which the outlet box is installed, the cable is inserted through a knockout window after the box is mounted in place, but the electrical appliance may not be connected to the cable and installed in the box until after the wall board is secured in place. The cable is thereby susceptible to accidental removal from the knockout windows before it can be connected to the appliance, and a significant effort may be required to reinsert the cable into the box.

Therefore, in order to fixedly retain the cable in the box for preventing such stressing on the connections or for preventing removal from the knockout window, clamping devices have been developed, which are secured in or adjacent each knockout window opening and are adapted to grasp the cable firmly for preventing withdrawal from the box. In fact, such clamping devices are presently required by the National Electric Code for multigang boxes and for so-called "old-work" boxes.

Presently, most cable clamping devices are formed as independent structures which have to be fabricated separately from the box itself, in relatively complicated structures, such as shown in U.S. Pat. Nos. 3,788,582 issued to Swanquist, and 3,493,205 issued to Bromberg. These structures, therefore, involve substantial fabrication costs over and above those making the box alone. In addition, since the clamping devices have to be affixed to the box, they also entail additional installation time and consequent expense. Moreover, in order to be fixedly secured in the knockout window of the box, the engaging means for the device must be proportioned to fit the particular configuration of the knockout window. Thus, unless all knockout window proportions are standardized, numerous sized and/or shaped devices are needed, thereby greatly increasing the costs for making them.

Although there are some electrical outlet boxes which have cable clamping means formed integrally with the box, such as U.S. Pat. No. 3,112,938 issued to Karlin, the clamping structures themselves do not automatically grasp the cable once the knockout window closure means has been removed. Rather, several manipulative steps are necessary in order to assemble the clamping structure. Thus, it is possible to erect the clamping structure with too large of a space between its cable grasping edges so that clamping is not effected, thereby necessitating more manipulation to establish the proper spacing between the clamping edges.

In addition, heretofore, the knockout windows have usually been closed by planar closure panels which are structurally independent of the clamping device. Although the panels perform their intended function satisfactorily, they must first be removed before the cable can be inserted into the box, thereby necessitating a two-step operation.

Accordingly, it is an object of the present invention to provide new and improved cable clamp means for electrical outlet boxes and the like. It is also an object of the present invention to provide new and improved closure means for cable entry ports in electrical outlet boxes and the like.

It is another object of the present invention to provide new and improved cable clamp means for electrical outlet boxes and the like, which automatically grasp virtually any size electrical cable.

It is an additional object of the present invention to provide new and improved cable clamp means as well as new and improved closure means for cable entry ports in electrical outlet boxes and the like, which can be relatively easily and inexpensively formed integrally with the box.

It is a further object of the present invention to provide new and improved cable clamp means for electrical outlet boxes and the like, adapted to include closure means for preventing access through the cable entry ports.

It is still another object of the invention to provide new and improved cable clamp means for electrical outlet boxes and the like, including closure means formed as part thereof, which can be opened simply by forcefully striking the end of the electrical cable thereagainst.

It is an additional object of the present invention to provide new and improved closure means for cable entry ports electrical outlet boxes and the like, which can be opened simply by forcefully striking the electrical cable against the closure means.

It is yet another object of the present invention to provide new and improved cable clamp means for electrical outlet boxes and the like, which can be formed integrally with the box yet permit conventional knockout window closure panels to be formed integrally with the box.

Objects and advantages of the invention are set forth in part above and in part below. In addition, these and other objects and advantages will become apparent herefrom, or may be appreciated by practice with the invention, the same being realized and attained by means of the instrumentalities, combinations and structures pointed out in the appended claims. Accordingly, the present invention resides in the novel parts, constructions, arrangements, improvements and structures herein shown and described.

SUMMARY OF THE INVENTION

Briefly described, the structure according to the present invention include a pair of flange members depending angularly towards each other from opposite sides of each cable entry ports formed in a sidewall portion of an electrical outlet box, the flange members adapted to enable closure of the cable entry ports for preventing access therethrough. According to one aspect of the invention, each pair of flange members comprise a pair of generally rigid but somewhat resilient cable grasping detent flanges, each mounted to its corresponding wall portion by a base-like projection adapted to space the flange inwardly from the wall portion. As here preferably embodied, each detent flange tapers slightly towards its inward end edge and is formed with a barblike projection extending parallel to and spaced from the inward end edge.

According to another aspect of the invention, the inward end edge of each flange member is coupled to the inward end edge of the other flange member in each cooperating pair. In addition, the cable entry port advantageously includes a portion extending into the backwall, proportioned to conform generally to the cross-sectional contour of the flange members, and a third, rigid, flange member extends inwardly from the sidewall portion, generally parallel to and adjacent the front-facing edges of the flange members. Advantageously, the coupling between the end edges of the flanges is adapted to rupture upon the application of a generally predetermined force.

The flange members may be joined together by separate web means extending from adjacent inward free end edges of each cooperating pair of flanges, and each cooperating pair of flange members may comprise a pair of generally rigid but somewhat resilient cable grasping detent flanges. As here preferably embodied, the detent flanges taper slightly towards their joined end edges and may be formed with barb-like projections extending parallel to and spaced from the inward end edges of the detent flanges. Alternatively, the flange members may be relatively thin, panel-like members forming a somewhat shallow angle with their corresponding sidewall portions, with their inward end edges joined directly to each other.

It will be apparent from the foregoing general description that the objects of the invention specifically enumerated herein are accomplished by the invention as herein disclosed. For example, it has been found that cable clamp means and cable entry port closure means in accordance with the present invention, may be formed integrally with the electrical outlet box. In addition, cable clamp means and cable entry port closure means according to the invention may be easily and relatively inexpensively incorporated integrally into an electrical outlet box.

By providing flange members comprising cable grasping detent flanges which depend from the sidewall portion and extend angularly towards each other, an electrical cable inserted into the space between their inward end edges will automatically be secured in the box. Moreover, by forming barb-like projections on adjacent surfaces of each cooperating pair of flange members, cable clamp means in accordance with the present invention can grasp virtually any size cable.

It has also been found that the cable clamp means and the cable entry port closure means according to the invention, being formed integrally with the electrical outlet box, permit the outlet box and these means to be molded from a moldable plastic material. Moreover, it has also been found that the need for fabricating complicated and/or independent clamping devices in different sizes will thereby be obviated.

It has further been found that by providing detent flanges attached to the box by base-like projections, cable clamp means may be formed integrally with the box along with the usual knockout window closure panels removably attached across the cable entry ports.

However, by joining the inward end edges of each cooperating pair of flange members, it will be found that the cable entry port may be closed thereby without the usual knockout window closure panel. In addition, by forming the cable entry port with a portion extending into the backwall and by including a third flange extending from the sidewall portion, parallel to the front edges of the flange members, the outlet box and the flange members may be conveniently molded in a two-part molding apparatus, such as an injection molding machine. Moreover, the joined flange members may be used as a combination automatic cable clamp and cable entry port closure structure or primarily as a cable entry port closure structure.

It will be understood that the foregoing general description as well as the following detailed description are exemplary and explanatory of the invention, but are not restrictive thereof. To this end, the accompanying drawings referred to herein and constituting a part hereof, illustrate preferred embodiments of the invention and, together with the description, serve to explain the principles of the invention.

BRIEF DESCRIPTION OF THE DRAWINGS

FIG. 5 is a partial elevation view of the back of the box shown in FIGS. 1 and 2, indicated at 5—5 of FIG. 4.

FIG. 6 is a section view similar to that shown in FIG. 3, illustrating another aspect of the invention.

FIG. 7 is a perspective view of part of an electrical outlet box incorporating an embodiment of cable clamp means made in accordance with another aspect of the invention.

FIG. 8 is a view along section 8—8 of FIG. 7.

FIG. 9 is a view along section 9—9 of FIG. 7.

FIG. 10 is a section view similar to that shown in FIG. 8, showing another aspect of the embodiment in FIGS. 7-9.

FIG. 11 is a section view similar to that shown in FIG. 9, illustrating cable entry port closure means made in accordance with the invention.

FIG. 12 is a view along section 12—12 of FIG. 11.

FIG. 13 is a section view similar to that shown in FIG. 12, showing cable insertion.

DETAILED DESCRIPTION OF PREFERRED EMBODIMENTS

Figure 1:
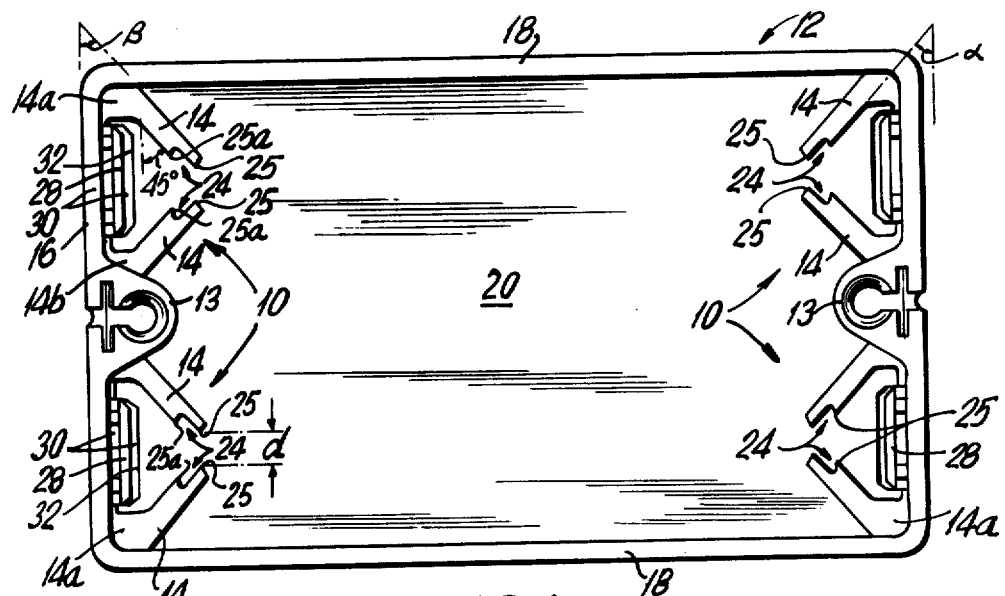
FIG. 1 is a front elevation of an electrical outlet box incorporating one embodiment of cable clamp means made in accordance with the present invention.

Referring now generally to the embodiments of the invention shown in the accompanying drawings, wherein like reference characters refer to like parts throughout the various views, there is shown, in FIGS. 1-6, an embodiment of cable clamp means made in accordance with the invention and indicated generally by reference number 10, which is adapted to be formed integrally with the sidewall member of electrical outlet box 12. As here embodied, box 12 includes back (or bottom) wall 20 with a sidewall member depending (or upstanding) therefrom, which is made up of oppositely disposed endwall portions 16 and oppositely disposed sidewall portions 18. It will be understood that box 12 may be suitably adapted for attachment to a stud, to wallboard and the like in any desired fashion. However, for convenience in describing the present invention, mounting means are not shown on the box.

In accordance with the invention, each cable clamp means 10 include a pair of detent flange members, both flange members indicated by reference number 14, which depend from opposite sides a knockout window openings formed in endwall portions 16. The knockout window openings are indicated generally at 22 and provide access to the interior of box 12 for an electrical cable. Detent flange members 14 are formed integrally with box 12 which, advantageously, is made from a moldable plastic material, preferably an injection moldable thermoplastic such as a blend of ABS and PPO (i.e., acrylonitrile-butadine-styrene and polyphenylene oxide, respectively) sold by the General Electric Co. under the trade name "NORYL", SE-100 or SE-1 grades, or a PVC (i.e., polyvinyl chloride) which will withstand the temperature requirements for cable clamps. However, they may also be made from a thermoset resinous material, particularly any that are adapted to be somewhat flexible.

As here embodied, each flange 14 extends from a portion of its corresponding endwall 16 so that its surface which faces endwall 16 forms an angle (indicated at $\alpha$ in FIG. 1) of about 45° with endwall 16. In addition, the angle, $\beta$, formed by the other surface of each flange member and the endwall is, advantageously, slightly smaller (e.g., 35°-40°) than that made by its inner surface so that the flange members taper slightly towards their inward edges for providing a generally rigid portion where the flange is attached to the endwall yet enabling some flexibility of the flanges at their free ends.

However, for additional flexibility, the thickness of the end portion of each detent flange may be reduced by about half, as by notch 24 formed at about 1/16" to about ⅛" from the end edge of each flange member to provide a generally flexible but resilient end to grasp a cable. Thus, the end edge of each flange is much more flexible than the rest of the flange so that relatively thin cables (such as indicated in phantom at 26 in FIG. 3) can be inserted between the inward grasping edges without causing the cable to bend. Moreover, the reduced thickness end edges enable secondary grasping points to be provided with substantial rigidity while the thin ends move out of the way of thicker cables, as will be described more fully below with reference to FIG. 6.

Accordingly, when insulated electrical cable 26 (preferably, a non-metallic sheathed cable), is inserted into an open entry port 22, the cooperating detent flanges 14 will resiliently flex inwardly of the box to permit relatively easy insertion of the cable. However, if a force is exerted on the cable, tending to remove the cable from opening 22, the free ends of detent flanges 14 will wedge into the insulation on cable 26 to prevent its removal. To this end, the free end edge of each detent flange 14 is formed with a generally sharp corner (indicated at 25 in FIG. 3) facing the other flange in each cooperating pair of flange members to provide a barb-like structure for wedging into the cable insulation. In addition, the distance between such cooperating sharp edges is advantageously proportioned to accommodate the variety of thicknesses for cables which may be received within knockout opening 22 in box 12. Thus, for example, for the usual residential single-and double-gang outlet boxes, adapted to accommodate #14, #12 or #10 wires, the spacing between the end edges of flange members 14 (indicated at d in FIG. 1) is advantageously dimensioned at about 0.15 inches.

However, when a relatively large-diameter cable (indicated at 27 in FIG. 6) is inserted into opening 22, the cooperating pair of flanges 14 spread apart in a generally curved configuration as shown in FIG. 6, since they essentially are cantilever beams. As a result, the inward end edges of flanges 14 may be unable to grasp the cable. Therefore, secondary grasping means, in the form of a projection (indicated at 25a in FIG. 3 and formed by notch 24), are preferably formed on each flange, recessed from the end edge 25, to grasp the insulation on thick cable 27 for preventing withdrawal thereof. Moreover, projections 25a can be stiffened, or buttressed, by providing any desired thickness to the portion of each flange between the notch 24 and the wall portion to which the flange is attached, to ensure a firm grasp on such large cables. Alternatively, flange 14 may be formed with barb-like projections such as projections 35 described below with reference to FIG. 10 rather than notch/barb 24/25a.

The flexible end edge portion of each flange is preferably dimensioned between about 0.030"-0.050" thick to provide the flexibility described above, with the thicknesses of the remaining flange portions determined by the angles $\alpha$ and $\beta$ described below if they are formed without secondary grasping means or with barbs 35. However, if the flange is formed with notch/barb 24/25a, the flange portion between the notch and the point of attachment may be made to any desired thickness.

Figure 2:
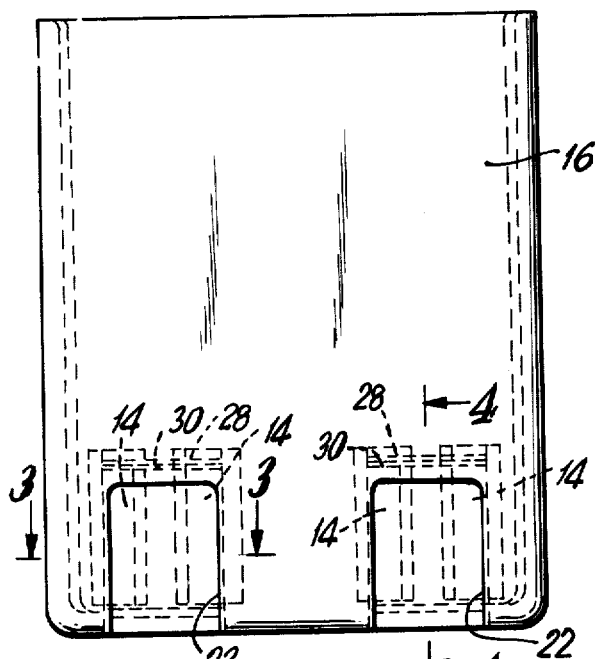
FIG. 2 is an elevation view of one endwall of the box shown in FIG. 1.
Figure 4:
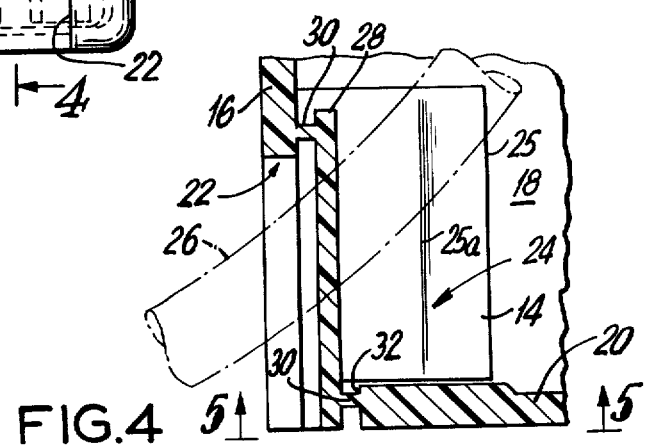
FIG. 4 is a view along section 4—4 of FIG. 2.

As preferably embodied, detent flange members 14 extend, lengthwise, form a point just in front of backwall 20 (as described more fully below with respect to FIG. 5) to a point forward of the front edge of opening 22, as shown in FIGS. 2 and 4. Accordingly, if cable 26 is inserted into opening 22 from behind the box so that it curves towards the front of the box (as indicated in phantom in FIG. 4), the cable will still be retained in the box by the portion of the cable clamp means, which lies forward of the front edge of opening 22.

According to the invention as illustrated in FIGS. 1-6, cable clamp means 10 may advantageously be adapted to permit the usual knockout closure means to be formed adjacent each cable entry port 22 for preventing fire spread as well as preventing any debris from entering any cable entry port that is not utilized for allowing access into the box for an electrical cable. To this end, each detent flange member 14 is preferably attached to its corresponding end wall portion 16 by a projection, or base portion, 14a, (best shown in FIGS. 1 and 3) which spaces the flange 14 inwardly from its corresponding end wall portion. In this way, the flanges 14 themselves will be sufficiently spaced inwardly to accommodate the usual knockout closure panels (indicated at 28) which are removably attached across each cable entry port 22. Advantageously, panels 28 are attached to end wall portions 16 by web members 30, with shoulder 32 formed on back wall 20 to facilitate removal, similar to the knockout window means disclosed in U.S. Pat. No. 4,007,852 which is assigned to the same assignee as the present application and which patent is hereby incorporated by reference herein. However, other conventional knockout window closure panels may be used.

Figure 3:
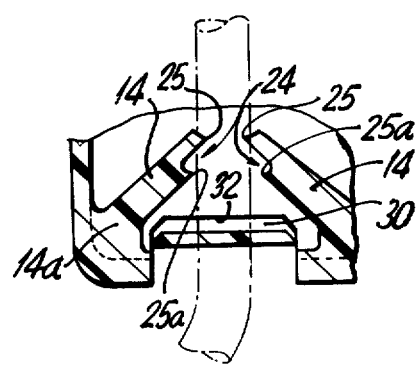
FIG. 3 is a view along section 3—3 of FIG. 2.

As preferably embodied, the side edges of knockout panel 28 are chamfered, or beveled, slightly (as shown in FIGS. 1 and 3) in order to permit the portions of the mold which form panels 28 and flange members 14 to be proportioned for sufficient structural strength to withstand the stresses generated during molding. Advantageously, shoulder 32 may be provided by forming back wall 20 with a generally thickened portion as shown in FIG. 4. In addition, it will be found that the base portions 14a associated with the flanges 14 which are positioned adjacent the screw-mounting lug (indicated at 13, which accommodates the screws for mounting the electrical fixture to the box) may, in part, extend directly from the lug and those associated with the flanges 14 which are positioned adjacent a side wall portion 18 may, in part, extend directly from that side wall portion. Advantageously, lugs 13 are adapted to accommodate screw mounting means such as disclosed in U.S. Pat. No. 3,955,463 which is assigned to the same assignee as the present application and is also incorporated by reference herein. For convenience, a lug 13 is not shown in FIG. 2.

Also as preferably embodied and as shown in FIG. 4, the back edges of detent flanges 14 are preferably formed separated from back wall 20 to enable them to act independently of the back wall. To this end, the portion of the injection mold which forms the exterior surface of back wall 20 may be formed with projections proportioned and positioned to correspond to the cross-sectional area of each flange 14, forming holes 21 which extend completely through back wall 20 to define the back edge of each flange 14. The back edge of each flange is thereby visible from the back of box 12, through slots 21 as shown in FIG. 5. In this context, it will be understood that by forming back wall 20 with a thickened portion, as shown in FIG. 4, the back wall will be sufficiently strong to withstand all the stress, impact, etc. required by Underwriter's Laboratories and any Code writing association.

It will be understood that although the cable clamp means according to the embodiment of the present invention illustrated in FIGS. 1-6 are preferably formed integrally in a molded plastic outlet box, they can be formed integrally in a metallic outlet box by, for example, cast molding a box from aluminum or an aluminum alloy or by forming a conventional metal outlet box and die stamping the side wall portions to form the detent flange members which can be bent inwardly to provide the cable entry ports. In addition, although the cable clamp means are shown in a rectangular box, they may be formed in any other conventionally shaped box, such as a round one.

Turning now to FIGS. 7-10, there is shown another aspect of the present invention, which obviates the need for separate or conventional knockout closure panels 28, by adapting the free ends of flange members 14 to provide the closure means for each cable entry port. To this end, generally thin web member 34 is attached along the free end edges of each cooperating pair of detent flange members 14, as shown in FIG. 8. Flange members 14 may be tapered, as described above, with the surface facing away from endwall portion 16 forming about a 35°–40° angle (i.e., angle $\beta$) therewith and the surface facing wall portion 16 making about a 45° angle (i.e., angle $\alpha$) therewith for reinforcing flanges 14.

Web 34 is attached to the free end edges of flanges 14 by additional web sections 36 which are recesses back from the oppositely disposed pointed edges 25 which project towards each other in each cooperating pair of flanges 14. In this way, if web 34 is completely removed (as will be described more fully below), the remnants of web portions 36 left on flanges 14 will be spaced from grasping edges 25 so as not to interfere with the grasping function.

As preferably embodied, each cable entry port 22 is formed with a component portion (designated at 22a) extending into backwall 20. The shape of entry port portion 22a generally conforms to that of the cross-sectional configuration provided by detent flange members 14, as indicated in FIG. 7. In this way, box 12, flanges 14 and webs 34 and 36 can be integrally formed from a moldable plastic material; and, the back edges of flange members 14 can be formed separated from backwall 20 to provide sufficient freedom for each flange 14 to flex independently of backwall 20 when cable 26 is inserted between a pair of flanges 14. In addition, a third flange (indicated at 38) may be formed on endwall portion 16 generally in front of the front edge of cable entry port 22 and adjacent the front edges of flange members 14. Third flange 38 serves not only to prevent fire spread and debris from falling into the interior of box 12 (when web 34 is not opened) but also to prevent a cable 26 from slipping forward (i.e. moving laterally towards the front of box 12), out of grasping engagement with the edges 25 of flange members 14. Thus, each cable entry port which is not utilized will remain substantially closed by the combination of flanges 14, webs 34 and 36 and flange 38.

Third flange 38 may also include rib-like portion 38b, extending perpendicular to flange 38, for reinforcing flange 38 to ensure it performs its closure function. In addition, the front-facing edges of flange members 14 are formed independently of third flange 38 and the back-facing edges of flange members 14 are formed independently of backwall 20, as shown in FIG. 9, to facilitate flexure of detent members 14. To this end, the innermost surface of web 34 may terminate even with the backwall upper lip (indicated at 20a) and the edges of flange 38 are proportioned to correspond to the contour of the inner surfaces of flanges 14 and web 34, or they may be spaced therefrom, as indicated at s in FIG. 10. In this way, the appropriate mold elements may be accommodated for forming the various surfaces and edges of flanges 14 and 38, web 34/36 and backwall 20 in a two-part molding machine.

In the event the cable is thick, the flanges may be provided with additional grasping means similar to projections 25a described with respect to FIG. 6. To this end, and referring particularly to FIG. 10, each flange 14 may be formed with barb-like projection 35 on its inwardly facing surface, positioned about 1/16" to about ⅛" from edge 25 to grasp the thick cable despite any bending in flanges 14. Furthermore, in order to form barbs 35 by a two-part molding machine as described above, flange 38 may be formed with two notches (indicated at 35a in FIG. 10).

According to one mode of operation, web portions 36 may be formed relatively thin so that web 34 resembles a narrow knockout panel which can be removed by pushing it inwardly with a screwdriver or similar tool. Alternatively, the tip of a prying tool may be inserted between the projecting portion 38a of third flange 38 and the front-facing edge of web 34 to break webs 36 by prying web 34 inwardly, using the edge of projecting portion 38a (reinforced by portion 38b) as a fulcrum. Thereafter, a cable may be inserted into the space between the oppositely disposed edges 25 which will grasp the cable, as described above with reference to FIG. 3.

According to another mode of operation, the center of web 34 may be formed with a reduced thickness (as indicated at 34a in FIGS. 8 and 10) relative to its edges which are attached to webs 36. Reduced thickness center-line 34a is adapted to break when a sufficient force (greater than, of course, the knockout force test required for knockout closure panels by Underwriters' Laboratories) is applied thereto. For example, in order to withstand a force of 10 pounds, center-line 34a may be about 0.010" thick, while the thickness of web 34 can be gradually increased to about 0.020" at its edge-attachment with webs 36 which may also be about 0.020" thick.

In operation, web 34 may be split into two sections, along its center-line, by pushing against or hitting center-line 34a with a screwdriver or other suitable tool. Thereafter, a cable may be inserted into the box, via the now-opened cable entry port 22, as the split portions of web 34 will be spread apart during insertion of the cable due to the web 36 being weaker than its corresponding flange 14.

Alternatively, and of particularly advantageous significance, center-line 34a may be broken by forcing the end of the insulated electrical cable against the center-line, with simply the rigidity of the cable, grasped at its end, being sufficient to rupture web 34 and open cable entry port 22. Thereafter, the cable may be inserted into the box as described above.

Turning then to FIGS. 11-13, there is shown a modification of the embodiments shown in FIGS. 7-10, which illustrates how the invention may be adapted to provide a new and improved cable entry port closure structure for electrical outlet boxes and the like. As here embodied, the two cooperating flange members (each indicated at 44) are formed generally similar to flange members 14 described above with reference to FIG. 7-10 except that they need not be tapered, and the inward end edges of both flanges 44 are joined directly to each other along line of attachment, or thin web 45. In addition, the angle formed between each flange 44 and the endwall 16 to which each is attached is smaller (i.e., about 30°) than either angle, angle α or angle β associated with flanges 14 and described above with reference to FIGS. 7-10. In addition, flanges 44 may be proportioned relatively thin (e.g., about 0.030" thick) and the line of connection 45 may also be relatively thin (e.g. about 0.010" thick, as indicated at t in FIG. 12).

In operation, the end of the insulated electrical cable (indicated at 46 in FIG. 12) may be forced against line web 45 as indicated by the arrow in FIG. 12 so as to rupture the web. Thereafter, the cable may be further inserted through the cable entry port 22, as shown in FIG. 13.

It will be understood by those skilled in the art that the pair of flanges, as embodied in either FIGS. 7-10 or FIGS. 11-13, provide convenient cable entry port closure means which enable the electrical cable to be inserted into the box, via the cable entry port, in a single step rather than first requiring removal of a knockout closure panel or like structure. In addition, the angled orientation of the flanges relative to their corresponding wall portion helps guide the end of the cable into the frangible connections (i.e., center-line 34a or connection line 45) between the pair of cooperating flanges. Furthermore, the angled flanges (14 or 44), combined with flange 38, will help prevent the spread of fire from within a wired box, by minimizing the free space around a cable inserted in the cable entry port. However, since the detent flanges 44 are relatively thin and form a relatively small angle with respect to their corresponding wall portions, they will provide only relatively light clamping of the cable, as compared with flanges 14, and will enable the cable to be removed from port 22 by applying a moderate force on the cable.

It will be understood by those skilled in the art that the invention, in its broader aspects, is not limited to the specific embodiments herein shown and described. Rather, variations may be made therefrom within the scope of the accompanied claims, without departing from the principles of the invention and without sacrificing its chief advantages.

What is claimed is:

1. In an electrical outlet box having a wall structure including a backwall with a generally continuous sidewall upstanding therefrom defining a chamber interior thereof which opens along front edges of the sidewall, at least one cable entry port being formed in a portion of the wall structure for permitting insertion of an electrical power cable into the box, cable clamp means associated with at least one cable entry port, each said cable clamp means including a pair of oppositely disposed panel-like members formed integrally with the wall structure adjacent said cable entry port and depending angularly inwardly of the box towards each other, each said cable clamp means also including entry port closure means adapted generally to close the cable entry port associated with the cable clamp means when said entry port is not in use generally for preventing entry of debris into the box, yet being adapted to permit access through the cable entry port when a cable is to be inserted therethrough, said closure means including a generally frangible web-like member extending between adjacent end edges of each pair of panel-like members and flange means projecting inwardly from said wall structure and extending adjacent to and essentially parallel to non-adjacent free end edges of its corresponding pair of panel-like members, said panel-like members being adapted to permit insertion of a cable into the box through the cable entry port associated therewith when said frangible web is broken, yet clamp the cable against withdrawal from said port, such that when the cable entry port has been opened by fracture of said frangible web, said panel-like members deflect generally away from each other during insertion of the cable to permit passage of the cable into the box, but grasp the cable to resist its removal from the cable entry port when subjected to a force tending to withdraw the cable from the port while said flange means prevents the cable from laterally slipping from the grasp of said panel-like members.

2. An electrical outlet box according to claim 1, wherein each panel-like member is formed with supplementary grasping means spaced from its inward end edge, facing the other panel-like member in each pair, said supplementary grasping means adapted to grasp relatively thick cables when inserted between a pair of panel-like members.

3. An electrical outlet box according to claim 2, wherein said supplementary grasping means are provided by a notch formed in each said panel-like member, said notch defining a generally sharp corner spaced from the inward end edge of each said panel-like member and reducing the thickness of said panel-like member between said sharp corner and its inward free end.

4. An electrical outlet box according to claim 2, wherein said supplementary grasping means comprises a rib-like projection formed on each said panel-like member.

5. An electrical outlet box according to claim 2, wherein said supplementary grasping means is spaced at between about 1/16" and about ⅛" from the inward end edge of each said panel-like members.

6. An electrical outlet box according to claim 1 wherein said web-like member is adapted to rupture generally along a predetermined line when a generally predetermined force is applied by manually forcing the end of an electrical power cable generally against the predetermined line, for permitting access through the cable entry post.

7. An electrical outlet box according to claim 6, wherein said web-like member includes a line-like portion of reduced thickness extending generaly parallel to the adjacent end edges of said panel-like members along which said rupture is to occur.

8. An electrical outlet box according to claim 1, wherein the inward end edge of each said panel-like member is formed to a relatively thinner thickness than the rest of said panel-like member.

9. An electrical outlet box according to claim 1, wherein said opposed panel-like members are tapered so as to have increased thickness at the base thereof adjacent said aperture, the free end portions of the tapered panel-like members having sufficient flexibility and resiliency so as to be deflected away from one another upon passage of said cable into said aperture and to thereafter bear against the installed cable to resist removal of the cable by a reverse outward force applied to the cable.

10. An electrical outlet box according to claim 9, which further includes supplementary grasping means on oppositely disposed surfaces of said panel-like members.

11. An electrical outlet box according to claim 9, wherein the outwardly facing surface of each of said panel-like member forms an approximately 45° angle with said wall portion and the inwardly facing surface of each of said panel-like member forms an approximately 35°–40° angle with said wall portion.

12. An electrical outlet box according to claim 1 wherein said panel-like members are tapered so as to have increased thickness at the base thereof adjacent the rim of said cable-entry port from which said panel-like members depend, the free end portion of each tapered panel-like member having sufficient flexibility and resiliency to deflect upon passage of said cable into said port and to thereafter resistingly bear against the installed cable, whereby a reverse outward force applied to said cable causes said free end portion of said panel-like members to be urged progressively more tightly against said cable and thereby clamp said cable against removal from said port.

13. An electrical outlet box according to claim 12, including supplementary cable gripping means for resisting outward movement of said electrical power cable from said cable entry port.

14. An improved electrical outlet box having a wall structure which defines a chamber interior thereof said wall structure including a backwall with a sidewall upstanding therefrom to define the interior chamber, with at least one cable entry port formed in the wall structure to permit access for an electrical cable to the interior box chamber, the improvement comprising cable entry port closure means associated with at least one cable entry port, each said cable entry port closure means including a pair of panel-like members formed integrally with the wall structure and depending inwardly of the box from the sidewall on opposite sides of the cable entry port, said panel-like members extending angularly towards each other, the inward adjacent end edges of said panel-like members in each pair being frangibly connected, with flange means projecting from the wall structure and extending parallel to non-adjacent free end edges of its corresponding pair of panel-like members, such that each cable entry port is substantially closed by said panel-like members and said flange means but may be opened by manually forcing the end of an electrical power cable against said panel-like members with a predetermined force to fracture the frangible connection between adjacent panel-like members.

15. An electrical outlet box according to claim 14, wherein said panel-like members define a generally v-shaped trough, the bottom of which is formed by the frangible connection between said panel-like members.

16. An electrical outlet box according to claim 1 or 14, wherein said panel means is self-adjusting to accommodate substantially different sizes of electrical power cables passing through said cable entry port.

17. An electrical outlet box according to claim 1, 2, 6, 8, 9 or 14, wherein each said cable entry port is formed at the intersection of the backwall with the sidewall and has a first portion formed in the sidewall and a second portion formed in the backwall, said panel-like members being formed adjacent one of said first and second port portions and the other of said port portions being generally V-shaped to correspond generally to said angularly depending panel-like members, and wherein said flange means comprises a flange member projecting adjacent and parallel to inwardly facing non-adjacent end edges of said panel-like members.

18. An electrical outlet box according to claim 17, wherein said second port portion is formed in the backwall of the box and is generally V-shaped with its widest opening at the intersection of the backwall and the sidewall, and wherein said flange member extends adjacent front-facing end edges of said panel-like members.

* * * * *